(12) United States Patent
Walaschek

(10) Patent No.: US 8,412,745 B1
(45) Date of Patent: Apr. 2, 2013

(54) RELATIONAL DATABASE MODEL OPTIMIZED FOR THE USE AND MAINTENANCE OF WATCHLIST DATA IN A HIGH DEMAND ENVIRONMENT

(75) Inventor: Bryan J. Walaschek, Port Matilda, PA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/232,412

(22) Filed: Sep. 14, 2011

(51) Int. Cl.
*G06F 17/30* (2006.01)

(52) U.S. Cl. ........ 707/802; 707/660; 707/686; 707/713; 707/715; 707/791; 707/793; 707/803

(58) Field of Classification Search .................. 707/660, 707/686, 713, 715, 791, 793, 803
See application file for complete search history.

(56) References Cited

U.S. PATENT DOCUMENTS

| | | | |
|---|---|---|---|
| 6,567,807 B1* | 5/2003 | Robles et al. | 1/1 |
| 7,945,035 B2* | 5/2011 | Michael et al. | 379/201.1 |
| 2004/0170263 A1* | 9/2004 | Michael et al. | 379/201.1 |
| 2006/0026678 A1* | 2/2006 | Zakas | 726/22 |
| 2011/0142237 A1* | 6/2011 | Iasso | 380/259 |
| 2012/0303805 A1* | 11/2012 | Simpson et al. | 709/224 |

\* cited by examiner

*Primary Examiner* — Frantz Coby
(74) *Attorney, Agent, or Firm* — Cantor Colburn LLP

(57) ABSTRACT

A data structure embodied on a computer-readable medium in conformance with a database schema for accessing and managing data related to a plurality of watchlists in a relational database system in a high demand environment, wherein the database schema comprising a watchlist table, a watchlist entry table for storing high-level information, and a plurality of detail tables for storing detailed information associated with a watchlist.

20 Claims, 1 Drawing Sheet

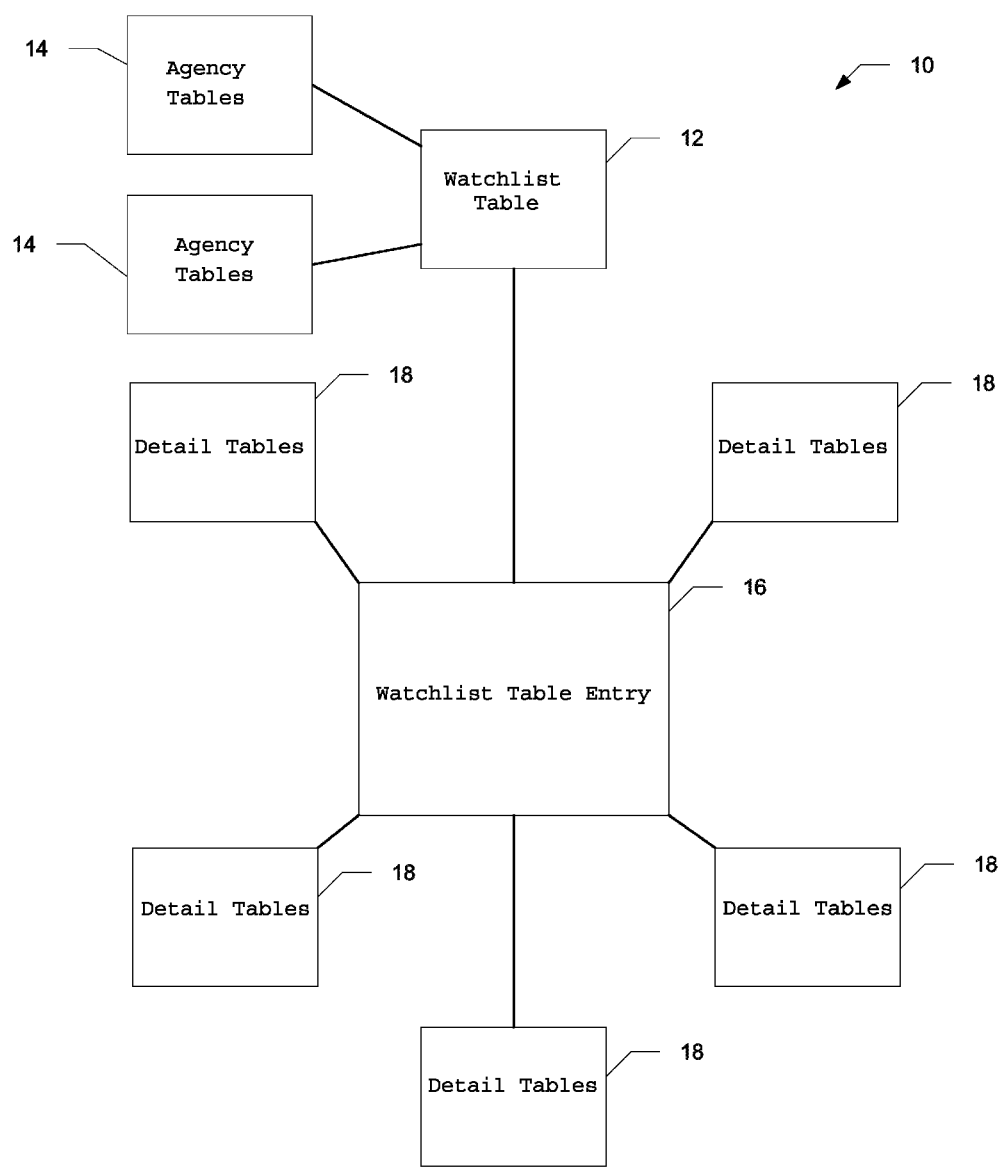

RELATIONAL DATABASE MODEL OPTIMIZED FOR THE USE AND MAINTENANCE OF WATCHLIST DATA IN A HIGH DEMAND ENVIRONMENT

TECHNICAL FIELD

This disclosure relates to a system and method for accessing and managing data related to a plurality of watchlists. More specifically, this disclosure relates to a method and system for accessing and managing data related to a plurality of traveler watchlists utilizing a watchlist table, a watchlist entry table for storing high-level information, and a plurality of detail tables associated with the watchlist entry table for storing detailed information.

BACKGROUND OF THE INVENTION

Processing international travelers for immigration and other purposes is a complex risk management function. The vast majority of international travelers are law-abiding citizens, however some travelers present risks for security, illegal immigration, narcotics smuggling, and customs revenue evasion (to name a few). Given the volume of travelers, the finite availability of control authority resources, and the constraints on time available for passenger processing, border agencies face significant challenges in identifying potentially risky travelers without delaying legitimate travel and trade The collection of pre-departure electronic data on travelers is emerging as the foundation of modern immigration control and border management. This approach is beneficial because electronic travel records can facilitate the implementation of a variety of automated functions, including watchlist checks and risk analysis, before passengers arrive. The analysis and presentation of this data also enables frontline immigration officers to be more effective during primary and secondary inspections. The combination of identifying risks earlier in the travel cycle and performing more effective primary inspections improves the processing time for arriving flights and facilitates international travel Hence, there exists a need in the industry to overcome these problems and provide a method and system for accessing and processing data related to watchlists. Additionally, there exists a need in the industry to allow skilled border protection resources to focus on better assessing travelers rather than on paperwork requirements.

SUMMARY OF THE INVENTION

According to one embodiment of the present disclosure, a system for accessing and storing traveler-related watchlist information is disclosed. In one aspect, a means for storing data related to one or more watchlists in a relational database management system ("RDBMS") is disclosed. In another aspect, a normalized layout of the tables of the database allows the RDBMS to satisfy queries in a performance-optimized manner, while the minimal number of required attributes allows for the greatest degree of flexibility in its use. Query information may be especially fast when the model is deployed in an enterprise class RDBMS incorporating such features as index- organized tables and partitioning.

An advantage of one embodiment of the disclosure may be improved performance in using and maintaining watchlist related data.

Another advantage of one embodiment of the disclosure may be separating detailed watchlist information from high level watchlist information.

Various embodiments of the disclosure may have none, some, or all of these advantages. Other technical advantages of the present disclosure may also be readily apparent to one skilled in the art.

BRIEF DESCRIPTION OF THE DRAWINGS

For a more complete understanding of the present disclosure and its advantages, reference is now made to the following descriptions, taken in conjunction with the associated drawing, in which:

FIG. 1 depicts a model of the system in accordance with the present disclosure.

DETAILED DESCRIPTION OF THE DRAWINGS

The disclosed system relates to a system 10 and method for accessing and managing data related to a plurality of watchlists in a relational database system in a high demand environment. In a preferred embodiment, the system 10 comprises a watchlist table 12, a plurality of agency tables 14, a watchlist entry table 16, and plurality of detail tables 18. In a preferred configuration, a hub-and-spoke architecture may be utilized wherein the watchlist entry table 16 serves as the hub with the plurality of detail tables 18 serving as the spokes.

The watchlist table 12 is preferably configured to capture or store metadata about the data stored throughout the system 10. This metadata may include (for example only) information about when the particular watchlist entry was created, loaded, or received from the respective agency. The metadata may also include temporal information wherein the temporal information may define an effective start and stop time for the particular watchlist.

The watchlist table 12 may also be associated with a plurality of agency tables 14. The agency tables 14 may realize the many-to-many relationship between agencies that produce or maintain watchlists (i.e. FBI, CIA, law enforcement, etc.) and the various watchlists that may be maintained within the system 10.

The watchlist entry table 16 may be a key component of the present disclosure. This main table may serve as the primary repository for high-level information related to watchlists. High-level information may include the minimal set of watchlist attributes which have been determined to increase system performance. For instance, attributes that are regularly searched in order to identify possible watchlist violations would appropriately be stored in the watchlist entry table 16, while the detailed information about the particular attributes would more preferably be stored in the detail tables 18.

In one preferred embodiment, the watchlist entry table 16 attributes are defined by the particular business requirements of the system 10. For example, in a security monitoring situation designed to assist in travel restriction databases (such as management and monitoring of a no-fly list), the watchlist entry table 16 attributes may include name, ethnic code, gender, date of birth, place of birth, height, hair color, eye color, and family information (such as the number of children cohabitating with the individual).

Thus, when the system 10 is fully populated, fast searches can still be performed to gather individuals that satisfy particular criteria maintained in the watchlist entry table 16. (I.e., the system 10 may quickly search for all individuals born in a certain city between a particular time.) Because each of these key attributes is stored in a single table, performance may be improved because the RDBMS is not called upon to perform joins across numerous related tables.

As would be understood to one of skill in the art, the list of key attributes stored in the watchlist entry table 16 may change based upon the particular business requirements. Thus, in the example discussed above, demographic information is a key searching component, and thus demographic information is properly stored in the watchlist entry table 16.

The watchlist entry table 16 is thus designed to store the attributes that are used for regular and fast searching of the entire data set stored in the system 10. The detail tables 18 preferably contain the detailed information about the respective high level information contained in the watchlist entry table 16. Once a search has been performed using the watchlist entry table 16, detailed information about the respective watchlist information may then be retrieved from the detail tables 18. Thus, the computationally expensive step of searching across all individuals for particular criteria is optimized by segregating pre-selected criteria into a watchlist entry table 16 and searching across that table. Once the individuals of interest are returned, detailed information about them can be retrieved from the detail tables 18.

The watchlist table 12, agency tables 14, watchlist entry table 16, and detail tables 18 may be centrally located in a single location or remotely located from one another. Additionally, the watchlist table 12 may be a single database table, or may be a combination of tables logically presented to appear as a single table.

Appendix A is a data model dictionary for one embodiment of the present disclosure for use in the immigration control and identity management space. The contents of Exhibit A is herein incorporated by reference.

The system 10 may preferably be implemented in a computing system, which can include a personal computer, a workstation, a network computer, a hand held computer, or any other computing system. Further, the system can be written as a software program in any appropriate computer language.

The system 10 may include a processing device, which can be any computer processing unit, and could be a single central processing unit, or a number of processing units configured to operate either in sequence or in parallel. The processing device can be configured to execute software processes which implement the steps disclosed herein. The system may also include a memory capable of storing the steps necessary for a processing device to implement the steps disclosed herein. This memory could be in the form of memory resident within the processing device or in the form of standalone memory coupled to the processing unit via a communication path, such as a bus or a network.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A data structure embodied on a computer-readable medium in conformance with a database schema for accessing and managing data related to a plurality of watchlists in a relational database system in a high demand environment, the database schema comprising:

a watchlist table for containing top-level metadata about each watchlist stored within the system wherein the top-level metadata comprises source information about each watchlist, and temporal information related to the enforceability of each watchlist; the watchlist table further associated with a plurality of agency tables wherein the plurality of agency tables comprise information about the agency associated with each watchlist;

a watchlist entry table for containing a minimal set of watchlist attributes comprising high-level demographic information about an individual to be watched wherein the high-level demographic information comprises a name, an ethnic code, a gender, a date of birth, a place of birth, height, hair color, eye color, and family information; and a plurality of detail tables wherein each detail table is associated with the watchlist entry table and contains detailed data comprising detailed information about each watchlist attribute contained in the watchlist entry table.

2. A system embodied on a computer-readable medium for accessing and managing data related to a plurality of watchlists in a relational database, the system comprising:

a watchlist table for containing top-level metadata about each watchlist stored within the system;

a watchlist entry table for containing a set of watchlist attributes; and a plurality of detail tables wherein each detail table is associated with the watchlist entry table and contains detailed data about each watchlist attribute contained in the watchlist entry table.

3. The system of claim 2 wherein the watchlist table comprises source information about each watchlist.

4. The system of claim 2 wherein the watchlist table comprises temporal information related to the enforceability of each watchlist.

5. The system of claim 2 wherein the watchlist table is further associated with a plurality of agency tables.

6. The system of claim 5 wherein the plurality of agency tables comprise information about the agency associated with each watchlist.

7. The system of claim 2 wherein the set of attributes contained in the watchlist entry table is a minimal set of attributes.

8. The system of claim 2 wherein the set of attributes comprises demographic information about an individual to be watched.

9. The system of claim 8 wherein the demographic information comprises a name, an ethnic code, a gender, a date of birth, a place of birth, height, hair color, eye color, and family information.

10. The system of claim 9 wherein the family information comprises the number of children known to be cohabitating with the individual.

11. The system of claim 2 further comprising a computer processor communicatively connected to the relational database.

12. The system of claim 2 further comprising a data storage device wherein the database is contained on the data storage device.

13. A method for optimizing access and management of data related to a plurality of watchlists in a relational database in a high demand environment utilizing a watchlist table, a watchlist entry table, and a plurality of detail tables, the method comprising the following steps:

storing top-level meta data about each watchlist in the watchlist table;

storing high-level watchlist information in the watchlist entry table and storing detailed watchlist information in the plurality of detail tables, wherein the plurality of detail tables is associated with the watchlist entry table in order to optimize performance.

14. The method of claim 13 wherein the high-level information is demographic information.

15. The method of claim 14 wherein the demographic information comprises a name, an ethnic code, a gender, a date of birth, a place of birth, height, hair color, eye color, and family information.

16. The method of claim 15 wherein the family information comprises the number of children known to be cohabitating with the individual.

17. The method of claim 13 wherein performance is optimized by searching only the watchlist entry table.

18. The method of claim 13 wherein the high-level information is a set of information pre-selected to optimize searching within the database.

19. The method of claim 13 further comprising searching the watchlist entry table based on a set of criteria, and then gathering detailed information about the results returned from the watchlist entry table by consulting the plurality of detail tables.

20. The method of claim 13 further comprising associating the watchlist table with a plurality of agency tables.

\* \* \* \* \*